US007060885B2

(12) United States Patent
Ishida et al.

(10) Patent No.: US 7,060,885 B2
(45) Date of Patent: Jun. 13, 2006

(54) MUSIC REPRODUCTION SYSTEM, MUSIC EDITING SYSTEM, MUSIC EDITING APPARATUS, MUSIC EDITING TERMINAL UNIT, MUSIC REPRODUCTION TERMINAL UNIT, METHOD OF CONTROLLING A MUSIC EDITING APPARATUS, AND PROGRAM FOR EXECUTING THE METHOD

(75) Inventors: Kenji Ishida, Shizuoka-ken (JP); Yoshiki Nishitani, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 212 days.

(21) Appl. No.: 10/621,975

(22) Filed: Jul. 17, 2003

(65) Prior Publication Data
US 2004/0011189 A1    Jan. 22, 2004

(30) Foreign Application Priority Data
Jul. 19, 2002   (JP) .......................... 2002-211322

(51) Int. Cl.
G10H 1/18    (2006.01)

(52) U.S. Cl. .......................... 84/626; 84/609; 84/658; 84/662

(58) Field of Classification Search .......... 84/615–620, 84/626, 662, 653–661
See application file for complete search history.

(56) References Cited

U.S. PATENT DOCUMENTS

| 4,341,140 A | * | 7/1982 | Ishida | 84/711 |
| 5,058,480 A | * | 10/1991 | Suzuki et al. | 84/600 |
| 5,177,311 A | | 1/1993 | Suzuki et al. | |
| 5,602,356 A | * | 2/1997 | Mohrbacher | 84/609 |
| 5,648,627 A | | 7/1997 | Usa | |
| 5,663,514 A | | 9/1997 | Usa | |
| 5,808,219 A | * | 9/1998 | Usa | 84/600 |
| 5,890,116 A | * | 3/1999 | Itoh et al. | 704/260 |
| 5,920,024 A | * | 7/1999 | Moore | 84/609 |
| 2001/0015123 A1 | | 8/2001 | Nishitani et al. | |
| 2003/0070537 A1 | | 4/2003 | Nishitani et al. | |

FOREIGN PATENT DOCUMENTS

GB    2377315    1/2003

* cited by examiner

Primary Examiner—Marlon Fletcher
Assistant Examiner—David S. Warren
(74) Attorney, Agent, or Firm—Harness, Dickey & Pierce, P.L.C.

(57) ABSTRACT

There is provided a music reproduction system which enables music editing and acoustic effect application by simple operations, for realizing a desired musical concept in an operator's mind. An operating terminal that can be carried by an operator generates motion information in response to motion of the operator carrying the operating terminal unit. Music data of a piece of music to be reproduced is edited based on the generated motion information. The motion information includes peak information indicative of magnitude of the motion. When a peak value indicated by the peak information exceeds predetermined first and second threshold values, music reproduction control information is generated based on the peak information, and when the peak value indicated by the peak information is larger than the first threshold value and smaller than the second threshold value, acoustic effect control information is generated based on the peak information. The music data is edited based on the music reproduction control information and the acoustic effect control information.

13 Claims, 13 Drawing Sheets

MOVEMENT OF OPERATING TERMINAL UNIT

GENERATED MOVEMENT LOCUS INFORMATION

LOCUS SHAPE INFORMATION = "CIRCULAR SHAPE"

LOCUS DIRECTION INFORMATION = "CLOCKWISE DIRECTION"

FIGURE-OF-8

OBLIQUELY CUT SHAPE

SQUARE SHAPE

SPIRAL SHAPE

SAW-TOOTHED SHAPE

TRIANGULAR SHAPE

FIG. 9

<ACOUSTIC EFFECT ITEM DETERMINATION TABLE TA>

| LOCUS SHAPE INFORMATION | LOCUS DIRECTION INFORMATION | ACOUSTIC EFFECT ITEM |
|---|---|---|
| CIRCULAR SHAPE | COUNTERCLOCKWISE DIRECTION | FIRST SOUND EFFECT |
| | CLOCKWISE DIRECTION | TONE EXTENSION |
| SAW-TOOTHED SHAPE | TRANSVERSE DIRECTION | REVERBERATION |
| | HORIZONTAL DIRECTION | VIBRATO |
| ... | ... | ... |
| SQUARE SHAPE | COUNTERCLOCKWISE DIRECTION | CHORUS |
| | CLOCKWISE DIRECTION | FIRST SOUND EFFECT |
| ... | ... | ... |

FIG. 10

<ACOUSTIC EFFECT LEVEL DETERMINATION TABLE TB>

| ACOUSTIC EFFECT ITEM | DYNAMICS VALUE | ACOUSTIC EFFECT LEVEL |
|---|---|---|
| TONE EXTENSION | a0 ~ a1 | LEVEL 1 |
| | a1 ~ a2 | LEVEL 2 |
| | a2 ~ a3 | LEVEL 3 |
| | ⋮ | ⋮ |
| FIRST SOUND EFFECT | b0 ~ b1 | LEVEL 1 |
| | b1 ~ b2 | LEVEL 2 |
| | b2 ~ b3 | LEVEL 3 |
| | ⋮ | ⋮ |
| REVERBERATION | c0 ~ c1 | LEVEL 1 |
| | c1 ~ c2 | LEVEL 2 |
| | c2 ~ c3 | LEVEL 3 |
| | ⋮ | ⋮ |
| VIBRATO | d0 ~ d1 | LEVEL 1 |
| | d1 ~ d2 | LEVEL 2 |
| | d2 ~ d3 | LEVEL 3 |
| | ⋮ | ⋮ |
| ⋮ | ⋮ | ⋮ |

BEATING OPERATION

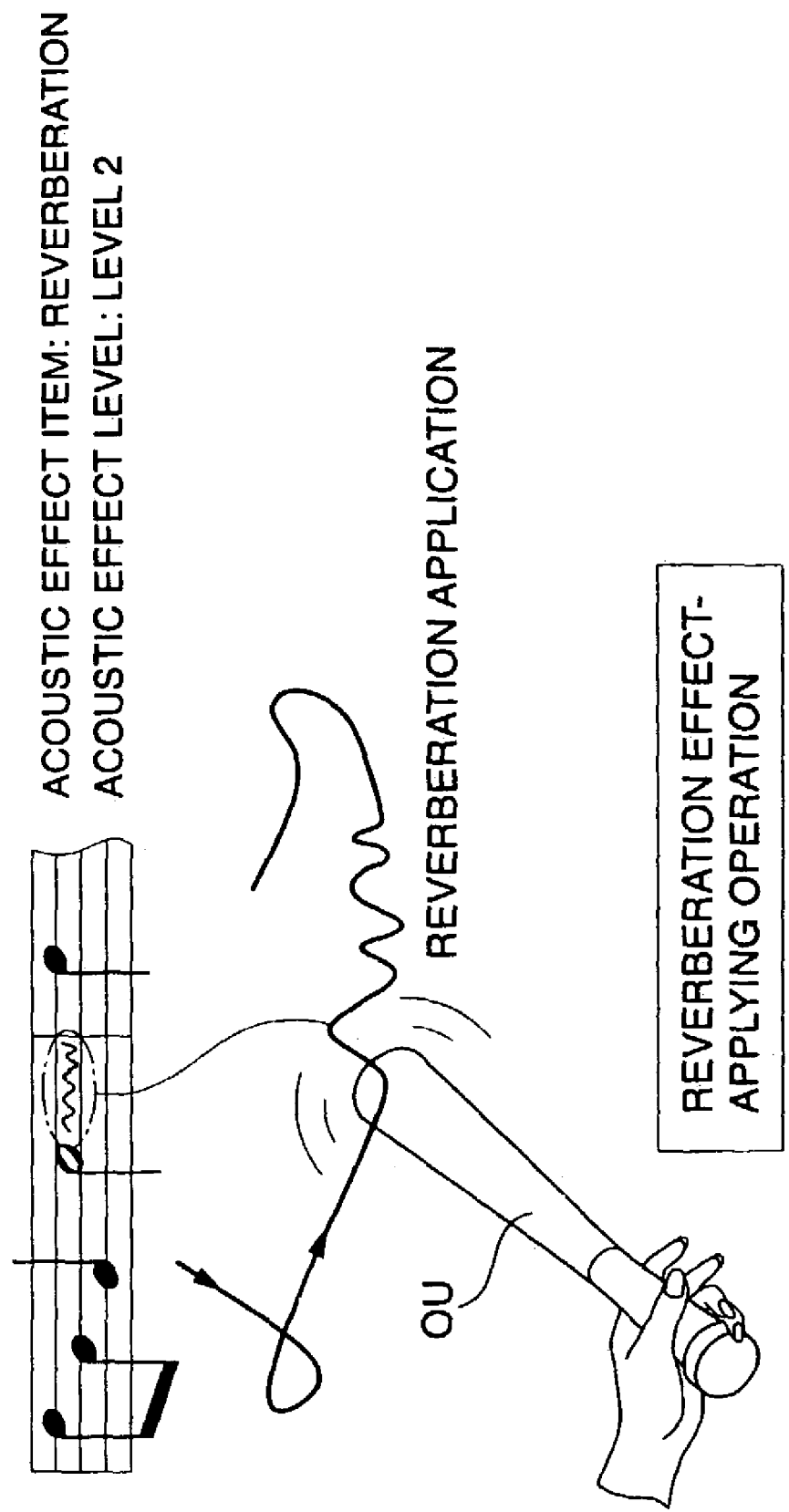

MUSIC REPRODUCTION SYSTEM, MUSIC EDITING SYSTEM, MUSIC EDITING APPARATUS, MUSIC EDITING TERMINAL UNIT, MUSIC REPRODUCTION TERMINAL UNIT, METHOD OF CONTROLLING A MUSIC EDITING APPARATUS, AND PROGRAM FOR EXECUTING THE METHOD

BACKGROUND OF THE INVENTION

1. Field of the Invention

The present invention relates to a music reproduction system, a music editing system, a music editing apparatus, a music editing terminal unit, a music reproduction terminal unit, a method of controlling a music editing apparatus, and a program for executing the method, and more particularly to a music reproduction system, a music editing system, a music editing apparatus, a music editing terminal unit, a music reproduction terminal unit, and a method of controlling a music editing apparatus, which enable a user to realize a desired musical concept in his/her mind and apply various sound effects to music, by simple operations, as well as a program for executing the method.

2. Description of the Related Art

In general, some users who are fond of listening to musical performance desire to enjoy not only listening to performance tones generated by reproduction of music data (e.g. MIDI (Musical Instrument Digital Interface) data, but also editing the music data in accordance with a desired musical concept in his/her mind and listening to performance tones generated by reproduction of the music data of his own editing.

Conventionally, users having such a desire utilize various music data-editing software installed on personal computers of their own or the like, to edit the existing music data of a piece of music e.g. by changing performance tempo of the piece of music, or applying desired acoustic effects (such as a reverberation effect) thereto.

However, in the case of utilizing a personal computer or the like to edit music data as described above, it is necessary for the users to cause the computer to once read the existing music data, and then add or change control codes for realizing the musical concept in his/her mind and control codes for applying acoustic effects (e.g. a control code for applying a reverberation effect), on a tone-by-tone, measure-by-measure, or phrase-by-phrase basis, which inevitably takes the users a lot of labor and time.

SUMMARY OF THE INVENTION

It is an object of the present invention to provide a music reproduction system, a music editing system, a music editing apparatus, a music editing terminal unit, a music reproduction terminal unit, and a method of controlling a music editing apparatus, which enable music editing and acoustic effect application by simple operations, for realization of a desired musical concept in his/her mind, as well as a program for executing the method.

To attain the above object, in a first aspect of the present invention, there is provided a music reproduction system comprising an operating terminal unit that can be carried by an operator, and generates motion information in response to motion of the operator carrying the operating terminal unit, a music editing apparatus that receives the motion information from the operating terminal unit and edits music data of a piece of music to be reproduced based on the received motion information, and a musical tone generating device that reproduces the edited music data supplied from the music editing apparatus to generate musical tones, wherein the music editing apparatus comprises a detector device that detects peak information indicative of magnitude of the motion of the operator from the received motion information, a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value, a music data editing device that edits the music data based on the music reproduction control information and the acoustic effect control information generated by the control information generating device, and an output device that outputs the music data edited by the music data editing device to the musical tone-generating device.

With the above arrangement of the music reproduction system according to the first aspect of the present invention, the music editing apparatus analyzes motion information received from the operating terminal unit to detect peak information indicative of magnitude of the motion, and when a peak value indicated by the peak information is larger than the first threshold value and at the same time larger than the second threshold value, generates music reproduction control information for controlling music reproduction of the piece of music (for controlling e.g. performance tempo and volume), while when the peak value is larger than the first threshold value and at the same time smaller than the second threshold value, the music editing apparatus generates acoustic effect control information for controlling at least one acoustic effect to be applied to the piece of music (for controlling e.g. a reverberation effect or a tone extension effect). Then, the music editing apparatus edits existing data based on the generated information, and the edited music data is output to the musical tone-generating device, for being sounded as reproduced musical tones. Thus, the operator can control reproduction of the music data and acoustic effects to be applied to the music data, merely by simple operations of the operating terminal unit, thereby achieving realization of a musical concept in the operator's mind and application of acoustic effects to the piece of music as he desires. As a result, even a beginner having no knowledge of MIDI or the like can easily and institutively apply acoustic effects to the original piece of music.

To attain the above object, in a second aspect of the present invention, there is provided a music editing system comprising an operating terminal unit that can be carried by an operator, and generates motion information in response to motion of the operator carrying the operating terminal unit, and a music editing apparatus that receives the motion information from the operating terminal unit and edits music data of a piece of music to be reproduced based on the received motion information, wherein the music editing apparatus comprises a detector device that detects peak information indicative of magnitude of the motion of the operator from the received motion information, a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value, and a music data editing device that edits the music data based on the music reproduction control information and the acoustic effect control information generated by the control information generating device.

To attain the above object, in a third aspect of the present invention, there is provided a music editing apparatus comprising a receiver device that receives, from an operating terminal unit that can be carried by an operator, motion information generated in response to motion of the operator carrying the operating terminal unit, a detector device that detects peak information indicative of magnitude of the motion of the operator from the motion information received by the receiver device, a music reproduction control information generating device that generates music reproduction control information for controlling music reproduction of a piece of music, based on the peak information, when a peak value indicated by the peak information is larger than a first predetermined threshold value and a second predetermined threshold value, an acoustic effect control information generating device that generates acoustic effect control information for controlling at least one acoustic effect to be applied to the piece of music, based on the peak information, when the peak value indicated by the peak information is larger than the first predetermined threshold value and smaller than the second predetermined threshold value, and a music data editing device that edits music data of the piece of music based on the music reproduction control information and the acoustic effect control information generated by the music reproduction control information generating device and the acoustic effect control information generating device, respectively.

Preferably, the music editing apparatus further comprises a locus shape identifying device that identifies a shape of a locus drawn by the operating terminal unit in accordance with the motion of the operator, based on the motion information, when the peak value indicated by the peak information is larger than the first predetermined threshold value and smaller than the second predetermined threshold value, and a first storage device that stores locus shape information indicative of shapes of loci to be drawn by the operating terminal unit and acoustic effect item information indicative of acoustic effects to be applied to the piece of music, in association with each other, and the acoustic effect control information generating device searches the first storage device using the shape of the locus identified by the locus shape identifying device, as a retrieval key, to obtain corresponding acoustic effect item information, and then generates the acoustic effect control information for controlling the acoustic effect indicated by the obtained acoustic effect item information, based on the peak information.

More preferably, the locus shape identifying device identifies not only the shape of the locus drawn by the operating terminal unit in accordance with the motion of the operator, but also a direction of the locus, based on the motion information, the first storage device storing the locus shape information, locus direction information indicative of directions of the loci, and the acoustic effect item information, in association with each other, and the acoustic effect control information generating device searching the first storage device using the shape of the locus and the direction of the locus identified by the locus shape identifying device, as retrieval keys, to obtain the corresponding acoustic effect item information from the stored acoustic effect item information, and then generates the acoustic effect control information for controlling the acoustic effect indicated by the obtained acoustic effect item information, based on the peak information.

More preferably, the music editing apparatus further comprises a second storage device that stores peaks values of the peak information and acoustic effect level values indicative of magnitude of each of acoustic effects to be applied to the piece of music, in association with each other, and the acoustic effect control information generating device searches the second storage device using the peak information detected by the detector device, as a retrieval key, to obtain a corresponding acoustic effect level value from the stored acoustic effect level values, and searches the first storage device using the shape of the locus and the direction of the locus identified by the locus shape identifying device, as retrieval keys, to obtain the corresponding acoustic effect item information from the stored acoustic effect item information, and then generates the acoustic effect control information based on the obtained acoustic effect level value and the obtained acoustic effect item information.

To attain the above object, in a fourth aspect of the present invention, there is provided a music editing terminal unit comprising a motion information generating device that can be carried by an operator, and generates motion information in response to motion of the operator, a music editing device that edits music data of a piece of music to be reproduced based on the motion information generated by the motion information generating device, a detector device that detects peak information indicative of magnitude of the motion of the operator from the motion information, and a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value, wherein the music editing device edits the music data based on the music reproduction control information and the acoustic effect control information generated by the control information generating device.

To attain the above object, in a fifth aspect of the present invention, there is provided a music reproduction terminal unit comprising a motion information generating device that can be carried by an operator, and generates motion information in response to motion of the operator, a music editing device that edits music data of a piece of music to be reproduced based on the motion information generated by the motion information generating device, a detector device that detects peak information indicative of magnitude of the motion of the operator from the motion information, and a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value, wherein the music data editing device edits the music data based on the music reproduction control information and the acoustic effect control information generated by the control information generating device, and outputs the edited music data to the musical tone generating device.

To attain the above object, in a sixth aspect of the present invention, there is provided a method of controlling a music editing apparatus that edits music data of a piece of music to be reproduced, comprising the steps of receiving, from an operating terminal unit that can be carried by an operator, motion information generated in response to motion of the operator carrying the operating terminal unit, detecting peak information indicative of magnitude of the motion of the operator from the received motion information, generating music reproduction control information for controlling music reproduction of the piece of music, based on the peak information, when a peak value indicated by the peak information is larger than a first predetermined threshold value and a second predetermined threshold value, generating acoustic effect control information for controlling at least one acoustic effect to be applied to the piece of music, based on the peak information, when the peak value indicated by the peak information is larger than the first predetermined threshold value and smaller than the second predetermined threshold value, and editing the music data based on the generated music reproduction control information and the generated acoustic effect control information.

To attain the above object, in a seventh aspect of the present invention, there is provided a program for causing a computer to execute a method of controlling a music editing apparatus that edits music data of a piece of music to be reproduced, the program comprising a module for receiving, from an operating terminal unit that can be carried by an operator, motion information generated in response to motion of the operator carrying the operating terminal unit, a module for detecting peak information indicative of magnitude of the motion of the operator from the received motion information, a module for generating music reproduction control information for controlling music reproduction of the piece of music, based on the peak information, when a peak value indicated by the peak information is larger than a first predetermined threshold value and a second predetermined threshold value, a module for generating acoustic effect control information for controlling at least one acoustic effect to be applied to the piece of music, based on the peak information, when the peak value indicated by the peak information is larger than the first predetermined threshold value and smaller than the second predetermined threshold value, and a module for editing the music data based on the generated music reproduction control information and the generated acoustic effect control information.

The above and other objects, features, and advantages of the present invention will become more apparent from the following detailed description taken in conjunction with the accompanying drawings.

BRIEF DESCRIPTION OF THE DRAWINGS

FIGS. 7A and 7B are diagrams useful in explaining movement locus information of the operating terminal unit in FIG. 2 generated by a locus shape/direction detector appearing in FIG. 5, in which:

FIG. 7A shows an example of a locus drawn by the operating terminal unit shown in FIG. 2; and FIG. 7B shows an example of the movement locus information generated by the locus shape/direction detector in FIG. 5 according to the locus of the operating terminal unit shown in FIG. 2;

FIGS. 8A to 8F are diagrams showing, by way of example, shapes of loci of the operating terminal unit shown in FIG. 2, stored in the personal computer system shown in FIG. 4, in which:

FIG. 8A shows movement locus information of a figure of 8;

FIG. 8B shows movement locus information of an obliquely cut shape;

FIG. 8C shows movement locus information of a square shape;

FIG. 8D shows movement locus information of a spiral shape;

FIG. 8E shows movement locus information of a saw-toothed shape; and

FIG. 8F shows movement locus information of a triangular shape;

FIG. 9 is a diagram useful in explaining an acoustic effect item determination table stored in a memory in FIG. 4;

FIG. 10 is a diagram useful in explaining an acoustic effect level determination table stored in the memory in FIG. 4;

FIG. 14 is a view useful in explaining another acoustic effect-applying operation of the operating terminal unit shown in FIG. 2.

DETAILED DESCRIPTION OF THE PREFERRED EMBODIMENTS

The present invention will now be described in detail with reference to the drawings showing a preferred embodiment and variations thereof. The embodiment and variations show only one aspect of the present invention, and the present invention can be modified and altered as desired within the spirit and scope thereof.

Figure 1:
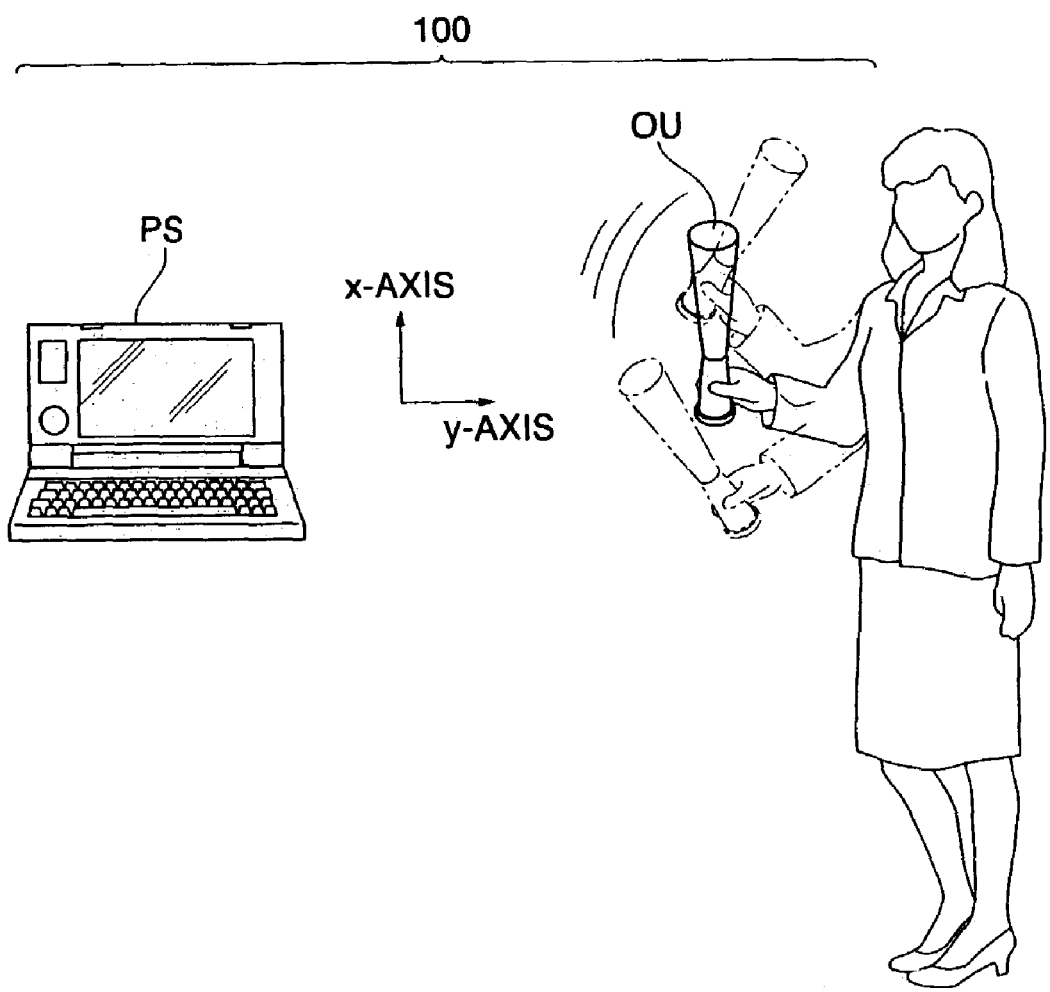
FIG. 1 is a view showing the arrangement of a music reproduction system according to an embodiment of the present invention.

Referring first to FIG. 1, there is shown the arrangement of a music reproduction system 100 according to an embodiment of the present invention.

In FIG. 1, the music reproduction system 100 is comprised of an operating terminal unit OU which can be carried by an operator, and a personal computer system PS that receives motion information generated in response to motion of the operator with the operating terminal unit OU and transmitted from the operating terminal unit OU, edits existing music data (MIDI data or the like) based on the received motion information, and reproduces the edited music data.

Figure 2:
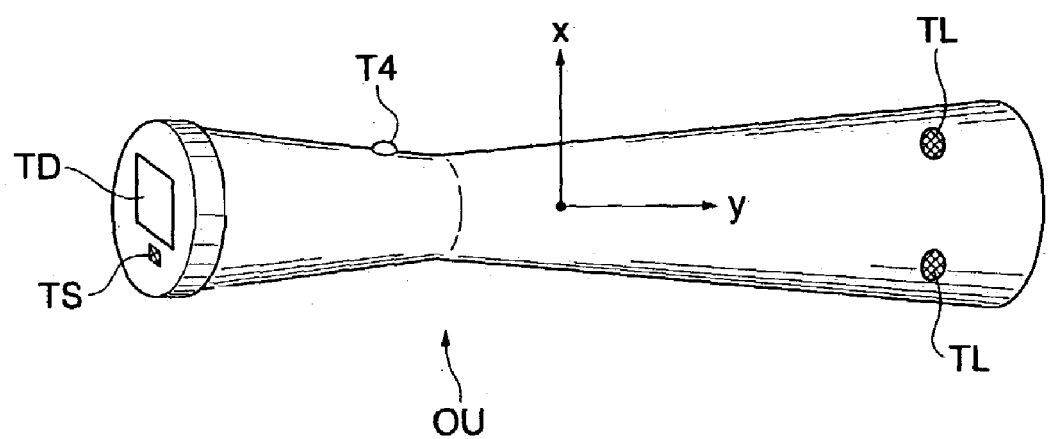
FIG. 2 is a perspective view of the appearance of an operating terminal unit of the music reproduction system shown in FIG. 1.
Figure 3:
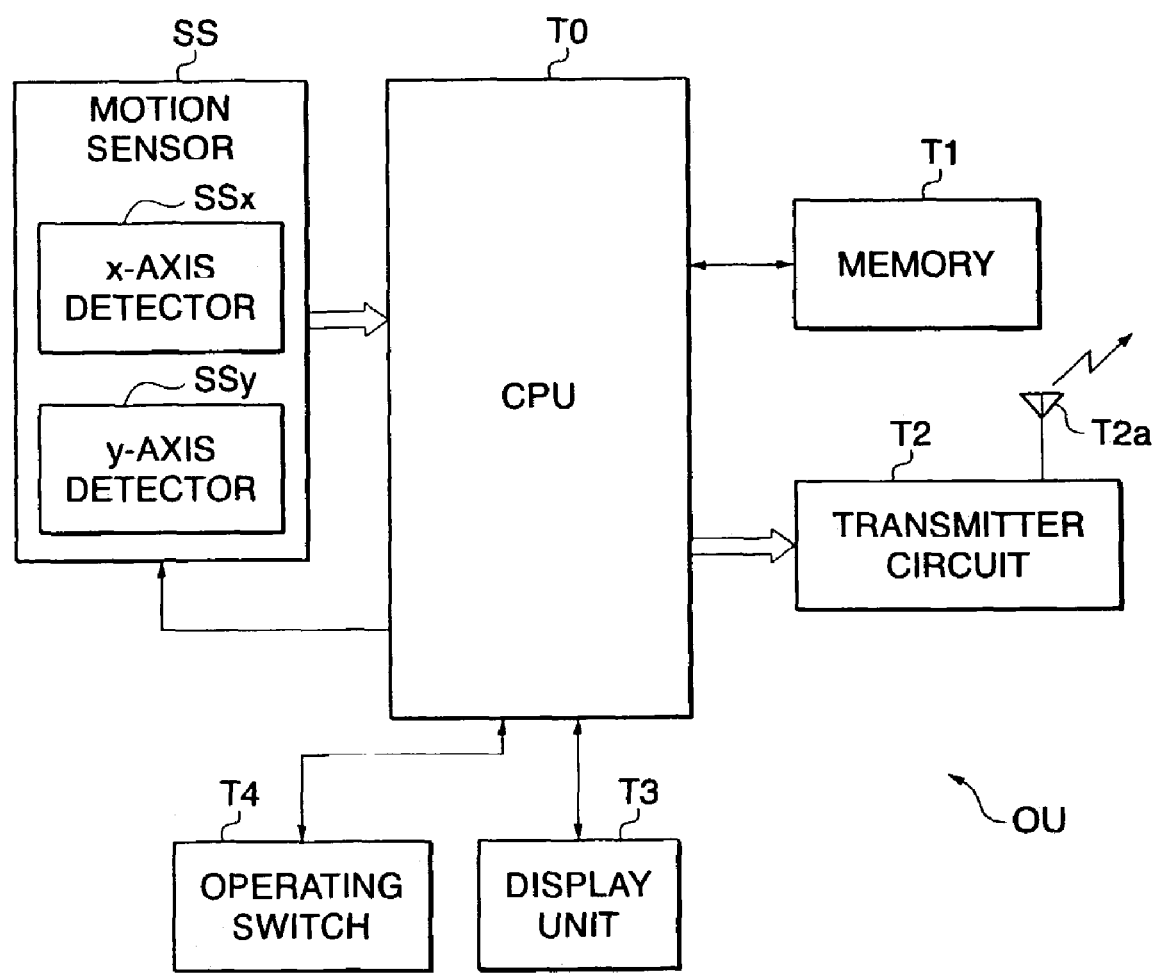
FIG. 3 is a block diagram showing the construction of the operating terminal unit shown in FIG. 2.

FIG. 2 is a perspective view showing the appearance of the operating terminal unit OU of the music reproduction system 100 shown in FIG. 1, while FIG. 3 is a block diagram showing the hardware construction of the operating terminal unit OU shown in FIG. 2.

As shown in FIG. 2, the operating terminal unit OU of the present embodiment is of a so-called hand-held type that the operator uses by holding it by hand, and comprised of a tapered base portion (left-side portion as viewed in FIG. 2) and a tapered end portion (right-side portion as viewed in FIG. 2), with opposite ends of the operating terminal unit OU having larger diameters and the central portion thereof having a smaller diameter.

The base portion has an average diameter smaller than that of the end portion for easy grip, and functions as a grip portion. In the outer surface of the bottom (left end as viewed in FIG. 2) of the base portion, there are provided an LCD display TD and a power switch TS for a battery power supply, not shown, and in the outer surface of the central portion, there is provided an operating switch T4. On the other hand, in the vicinity of the distal end of the end portion, there are arranged a plurality of LED (Light Emitting Diode) light emitters TL. The operating terminal unit OU having the above described shape contains various devices. Although in the present embodiment, the operating terminal unit OU of the hand-held type is illustrated by way of example, the present invention is also applicable to other various types of operating terminal units, including a type worn on the arm or foot using a belt or the like, and a shoe type.

A CPU T0 appearing in FIG. 3 controls various components of the operating terminal unit OU including a motion sensor SS, based on various control programs stored in a memory T1 including a ROM and a RAM, and so forth.

When musical tones are generated using the music reproduction system 100, the motion sensor SS detects motion of the operator carrying the operating terminal unit OU (e.g. a motion of the operator's hand holding the operating terminal unit OU) and generates motion information dependent on the direction, magnitude and speed of the motion.

The motion sensor SS employed in the present embodiment is implemented e.g. by a two-dimensional acceleration sensor and comprised of an x-axis detector SSx for detecting acceleration in an x-axis direction (transverse direction) and a y-axis detector SSy for detecting acceleration in a y-axis direction (longitudinal direction). Although in the present embodiment, the motion sensor SS is thus implemented, by way of example, by the two-dimensional acceleration sensor, it is also possible to employ a three-dimensional acceleration sensor, a three-dimensional speed sensor, a two-dimensional speed sensor or any other kind of sensor which is capable of detecting operator's motion.

A transmitter circuit T2 includes an antenna T2a, as well as a high-frequency transmitter and a power amplifier (neither of which is shown) and radio-transmits under the control of the CPU T0 the motion information supplied from the CPU T0, to the personal computer system PS in FIG. 1.

A display unit T3 includes the LCD display TD and the plurality of LED light emitters TL (see FIG. 2) and displays under the control of the CPU T0 various information of a sensor number, an in-operation state, a power supply alarm, and so forth.

The operating switch T4 is for switching on/off the power supply to the operating terminal unit OU and setting various operation modes thereof. Driving power is supplied to the above components from the battery power supply, which may be formed by a primary battery, or alternatively by a rechargeable secondary battery.

Figure 4:
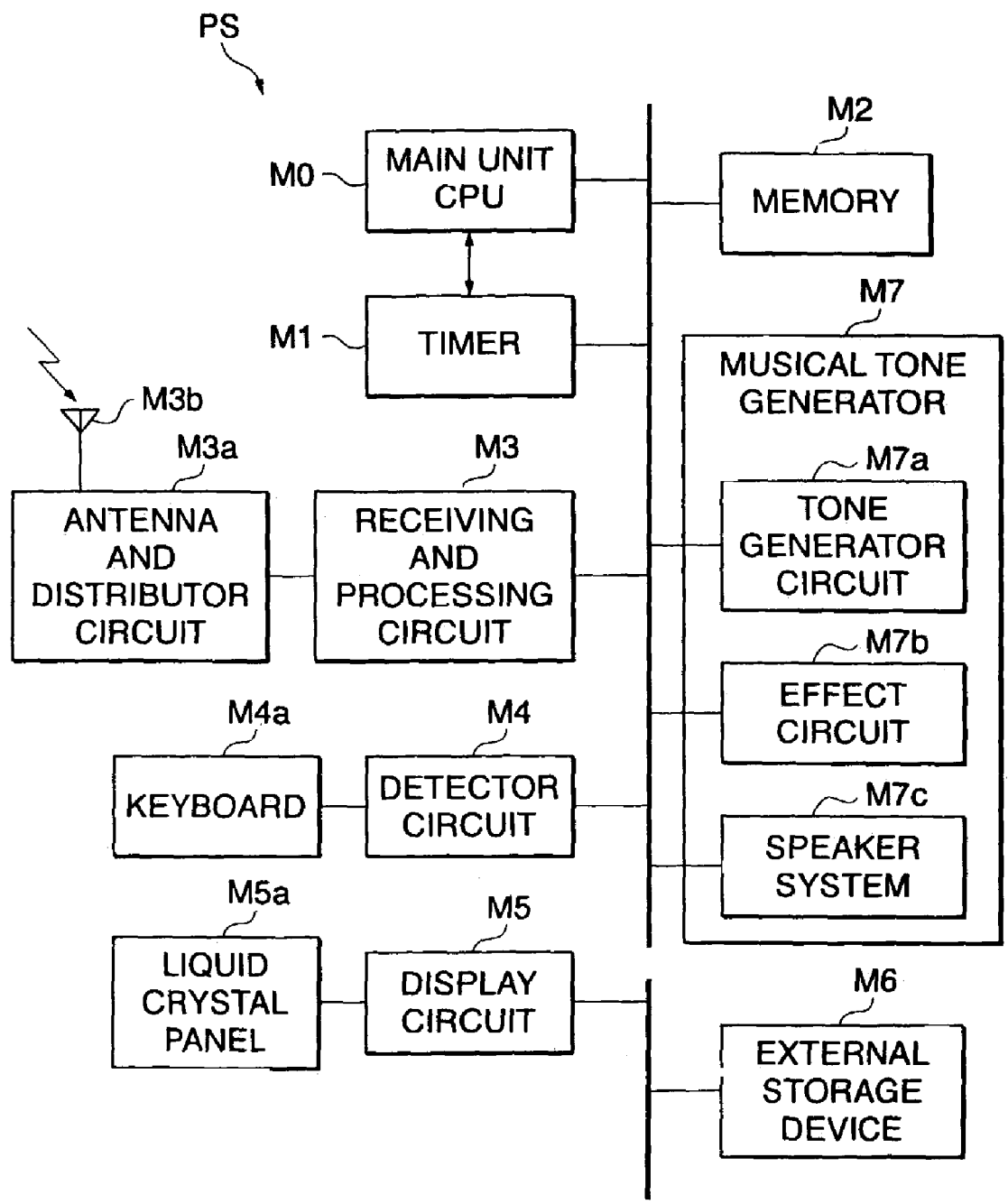
FIG. 4 is a block diagram showing the arrangement of a personal computer system in FIG. 1.

FIG. 4 shows the arrangement of the personal computer system PS in FIG. 1.

As shown in FIG. 4, the personal computer system PS has not only the same functions as those of an ordinary personal computer, but also the function of receiving motion information radio-transmitted from the operating terminal unit OU, the function of editing existing music data based on the received motion information, and the function of reproducing the edited music data.

A main unit CPU M0 performs control of the overall operation of the personal computer system PS, including various kinds of control, described in detail hereinafter, based on predetermined programs under time control by a timer M1 used in generating a tempo clock and an interrupt clock.

A memory M2 includes a nonvolatile memory, such a ROM, and a volatile memory, such a RAM. The memory M2 stores an operating system executed by the main unit CPU M0, predetermined control programs for controlling the personal computer system PS, and so forth.

A receiving and processing circuit M3, to which is connected an antenna and distributor circuit M3a comprised of a multi-channel high-frequency receiver, receives the motion information transmitted from the operating terminal unit OU via an antenna M3b and the antenna and distributor circuit M3a, and performs predetermined signal processing on the received signal.

Connected to a detector circuit M4 are a keyboard M4a and a mouse, not shown. The operator uses the keyboard M4a and/or the mouse to carry out various setting operations including setting of various modes necessary for performance data control and setting of tone colors (tone sources) to performance tracks.

Connected to a display circuit M5 is a liquid crystal panel M5a, on which various information of music data being currently edited is displayed.

An external storage device M6 is implemented by at least one storage device, such as a hard disk drive (HDD), a compact disk read only memory (CD-ROM) drive, a floppy disk drive (FDD), a magneto-optical (MO) disk drive, and a digital versatile disk (DVD) drive, and capable of storing existing music data and edited music data.

A musical tone generator M7 generates musical tones based on edited music data (hereinafter referred to as "user's original music data") supplied from the main unit CPU M0 and is comprised of a tone generator circuit M7a, an effect circuit M7b, and a speaker system M7c.

The tone generator circuit M7a reads the user's original music data supplied from the main unit CPU MO, to thereby sequentially generate music signals corresponding to the user's original music data.

The effect circuit M7b is implemented e.g. by a DSP (Digital Signal Processor) and imparts various acoustic effects to the musical tone signals generated by the tone generator circuit M7a, and outputs the resulting musical tone signals to the speaker system M7c.

The speaker system M7c includes an D/A converter and an amplifier, neither of which is shown, and converts a musical tone signal received from the tone generator circuit M7a via the effect circuit M7b to musical tones for output.

In the following, the functions of the personal computer system PS shown in FIG. 4 will be described with reference to FIG. 5 and other figures.

Figure 5:
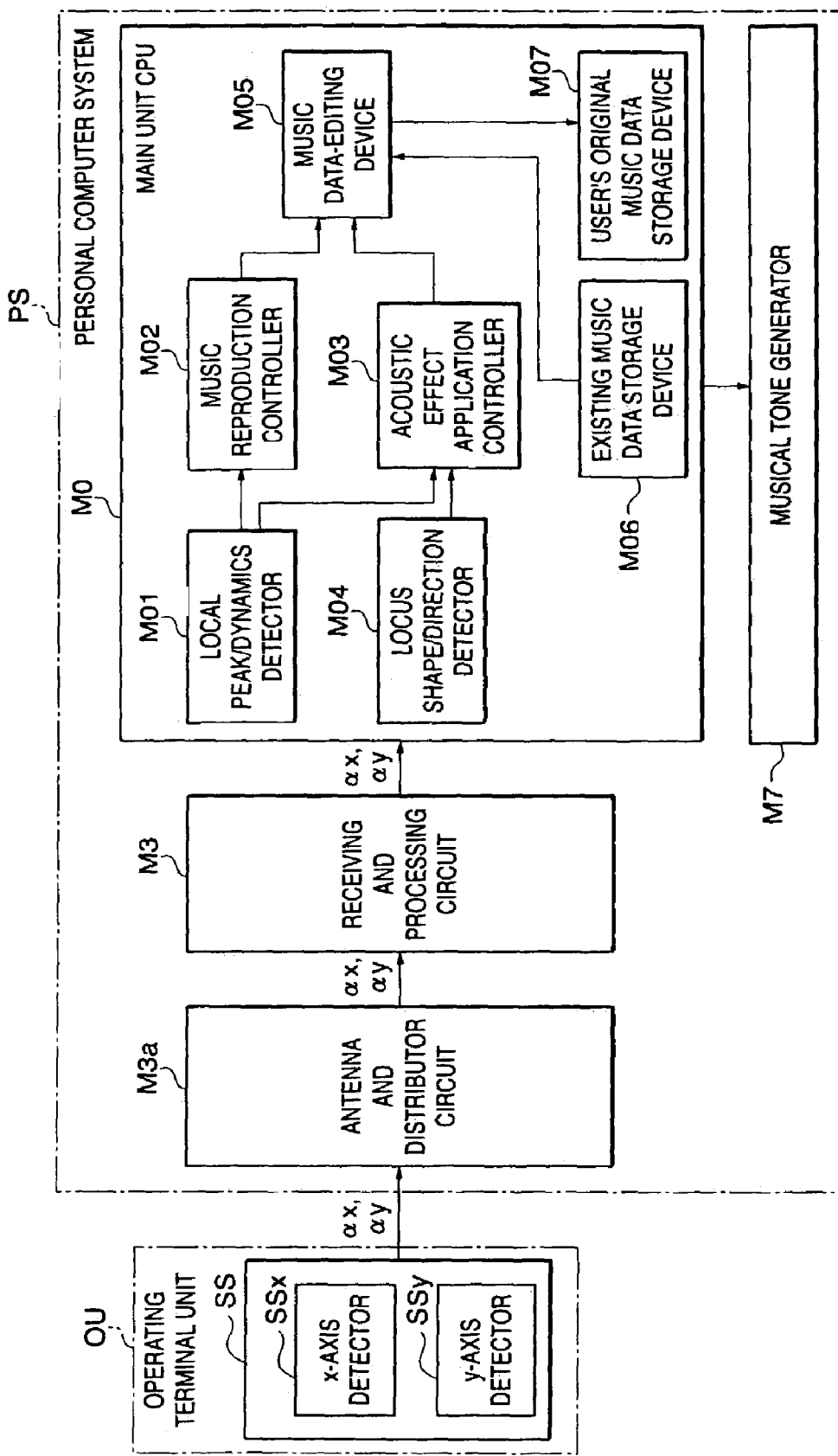
FIG. 5 is a block diagram useful in explaining functions of the personal computer system in FIG. 4.

FIG. 5 is a diagram useful in explaining the functions of the personal computer system PS shown in FIG. 4.

When the operator holds and operates by hand the operating terminal unit OU shown in FIG. 2 which contains the motion sensor SS, motion information generated based on the direction, magnitude, and speed of the motion of the operating terminal unit OU being operated is transmitted from the operating terminal unit OU to the personal computer system PS. More specifically, the x-axis detector SSx and y-axis detector SSy of the motion sensor SS of the operating terminal unit OU output an acceleration sensor signal αx indicative of an acceleration in the x direction (transverse direction) and an acceleration sensor signal αy indicative of an acceleration in the y direction (longitudinal direction), respectively, and these acceleration sensor signals αx, αy are transmitted as the motion information from the operating terminal unit OU to the personal computer system PS.

In FIGS. 4 and 5, after receiving the acceleration sensor signals αx, αy via the antenna M3b, the antenna and distributor circuit M3a outputs these signals to the receiving and processing circuit M3. The receiving and processing circuit M3 carries out predetermined filtering processing on the signals αx, αy sequentially supplied from the antenna and distributor circuit M3a to remove noise components contained therein, and then outputs the processed acceleration sensor signals as acceleration data αx, αy to the main unit CPU M0.

When receiving the acceleration data αx, αy from the receiving and processing circuit M3, a local peak/dynamics detector M01 analyzes the acceleration data to obtain an acceleration value α indicative of the magnitude of an acceleration vector as the sum of respective vectors of accelerations in the x-axis direction and the y-axis direction, and thereby detect a local peak and dynamics.

Figure 6:
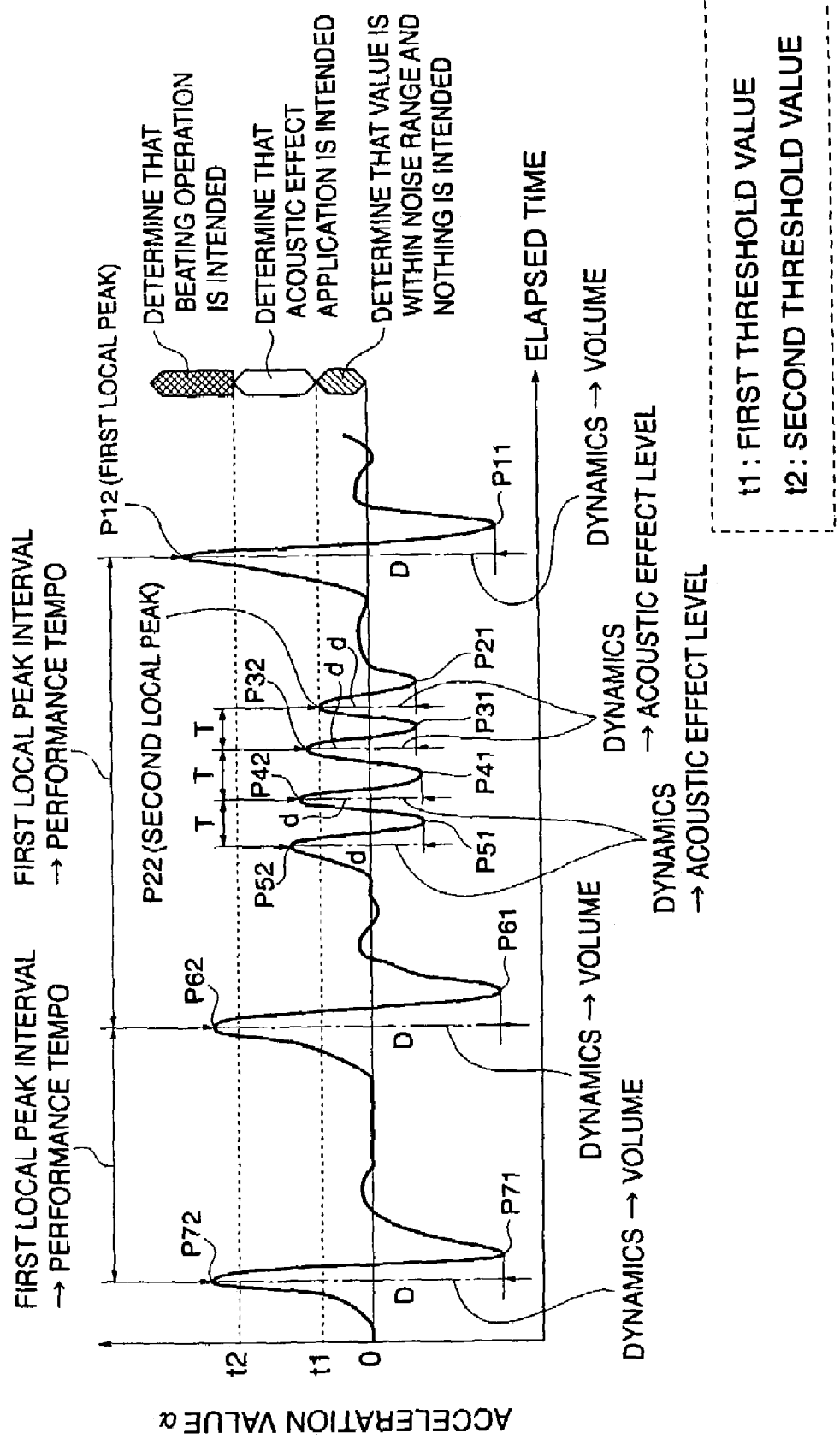
FIG. 6 is a timing chart showing, by way of example, changes in an acceleration value of the operating terminal unit shown in FIG. 2.

FIG. 6 is a timing chart illustrating an example of changes in the acceleration value α of the operating terminal unit OU shown in FIG. 2.

When the acceleration value α is determined based on the acceleration data αx, αy, the local peak/dynamics detector M01 starts detecting peaks (peak information) of the acceleration value α. Upon detection of a peak, the local peak/ dynamics detector M01 determines whether or not an acceleration value (peak value) corresponding to the peak is positive (assuming that values of acceleration in the moving direction of the operating terminal unit OU are positive). If the detected peak value is negative (see a peak value p11 in. FIG. 6), the local peak/dynamics detector M01 continues detection of peaks.

On the other hand, if the detected peak value is positive (see a peak value p12 in FIG. 6), the local peak/dynamics detector M01 reads out a first threshold value t1 (>0) and a second threshold value t2 (>t1) stored in advance in the memory M2, and performs comparison between the threshold values t1, t2 and the peak value (e.g. the peak value p12) detected this time. The first and second threshold values t1 and t2 stored in the memory M2 can be preset e.g. when the personal computer system PS is manufactured, but an operator may be allowed to set or change them freely e.g. by operating the keyboard M4a of the personal computer system PS.

If it is determined that the peak value detected this time is larger than the first threshold value t1 and at the same time larger than the second threshold value t2 (see the peak value p12 in FIG. 6), the local peak/dynamics detector M01 judges that a beating operation is intended by the operator. When a peak exceeding both the first threshold value t1 and the second threshold value t2 (hereinafter referred to as "a first local peak" for convenience of description) is detected as described above, the local peak/dynamics detector M01 calculates the difference between the value of the peak (e.g. the peak value p12) and the corresponding negative peak value (e.g. the peak value p11) as a dynamics value (see dynamics values D in FIG. 6), and sends the obtained dynamics value D and a notification that the first local peak has been detected, to a music reproduction controller M02.

The music reproduction controller M02 determines the volume level of a musical tone to be reproduced, based on the dynamics value D sent from the local peak/dynamics detector M01, and determines a performance tempo of the musical tone to be reproduced based on a time interval between the two first local peaks from the last detected by the local peak/dynamics detector M01. More specifically, the memory M2 stores a volume level determination table, not shown, in which dynamics values D are associated with volume levels of musical tones to be reproduced, and when receiving a dynamics value D from the local peak/dynamics detector M01, the music reproduction controller M02 refers to the volume level determination table to obtain a volume level corresponding to the dynamics value D.

Further, when notified by the local peak/dynamics detector M01 that the first local peak has been detected, the music reproduction controller M02 refers to a timer, not shown, and records in the memory M2 the time the notification was received. Whenever the notification that a first local peak has been detected is received from the local peak/dynamics detector M01, the music reproduction controller M02 repeatedly carries out the operation to determine a time interval between two first local peaks from the last. The memory M2 also stores a performance tempo determination table, not shown, in which detected time intervals between pairs of first local peaks are associated with performance tempos of the musical tone to be reproduced. When a time interval between first local peaks is determined as described above the music reproduction controller M02 refers to the performance tempo determination table to obtain a performance tempo corresponding to the determined time interval between the first local peaks. The music reproduction controller M02 determines a volume level and a performance tempo as described above, and delivers these as music reproduction control information to a music data-editing device M05.

On the other hand, if the peak value detected this time is larger than the first threshold value t1 and at the same time smaller than the second threshold value t2 (see a peak value p22 in FIG. 6), the local peak/dynamics detector M01 judges that not a beating operation but acoustic effect application is intended by the operator. When a peak larger than the first threshold value t1 and at the same time smaller than the second threshold value t2 (hereinafter referred to as "a second local peak" for convenience of description) is detected as described above, the local peak/dynamics detector M01 calculates the difference between the value of the peak (e.g. the peak value p22) and the corresponding negative peak value (e.g. the peak value p21) as a dynamics value (see dynamics values d in FIG. 6), and sends the obtained dynamics value d and a notification that the second local peak has been detected, to an acoustic effect application controller M03.

A locus shape/direction detector M04 determines information of a movement locus (hereinafter simply referred to as movement locus information) of the operating terminal unit OU based on the acceleration data αx, αy supplied from the receiving and processing circuit M3. It should be noted that the movement locus information includes locus shape information indicative of a shape (e.g. a circular shape, a triangular shape, etc.) of the corresponding movement locus, and locus direction information indicative of a direction (e.g. a transverse direction, a horizontal direction, a rotational direction, etc.) in which the movement locus was drawn.

Figure 7A:
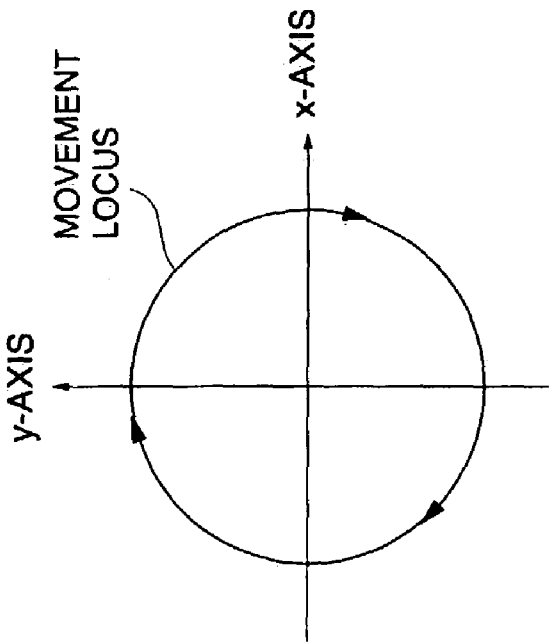
Figure 7B:
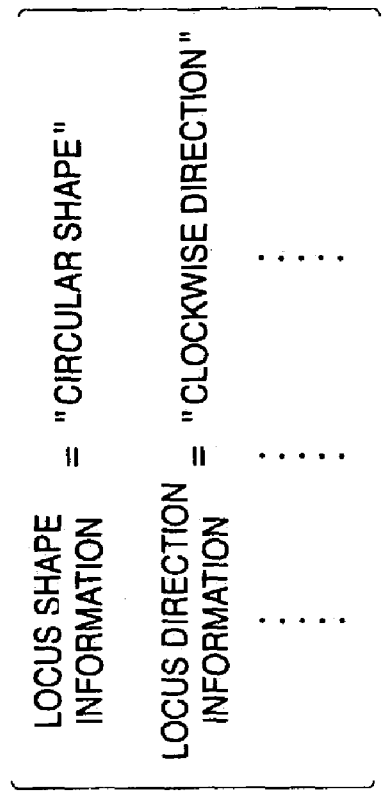

FIGS. 7A and 7B are diagrams useful in explaining movement locus information of the operating terminal unit OU shown in FIG. 2, which is generated by the locus shape/direction detector in FIG. 5.

For example, when the operator moves the operating terminal unit OU clockwise as viewed from the operator's side, drawing a small circle, movement locus information shown in FIG. 7B is generated by the locus shape/direction detector M04. More specifically, locus shape information indicating that the shape of the movement locus drawn by the operating terminal unit OU is "circular" and locus direction information indicating that the direction of the movement locus drawn by the operating terminal unit OU is "clockwise" are generated by the locus shape/direction detector M04.

Figure 8A:
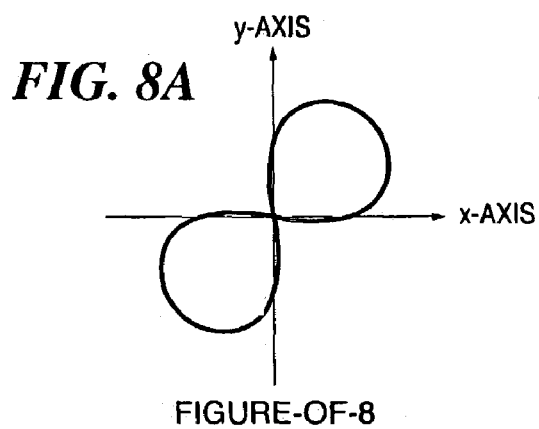
Figure 8B:
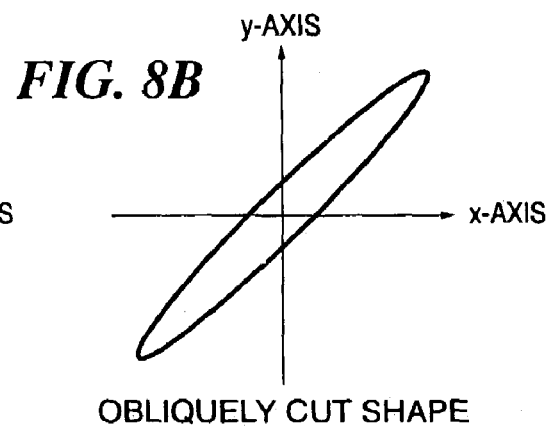
Figure 8C:
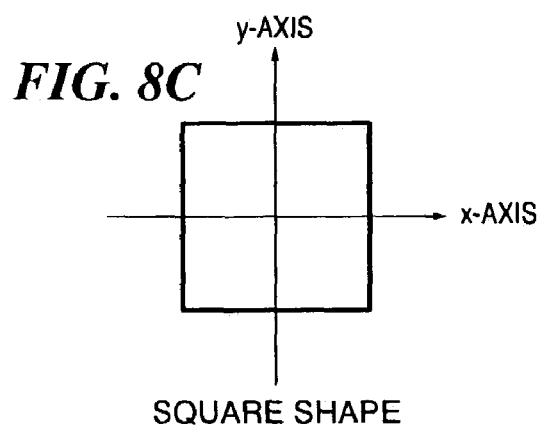
Figure 8D:
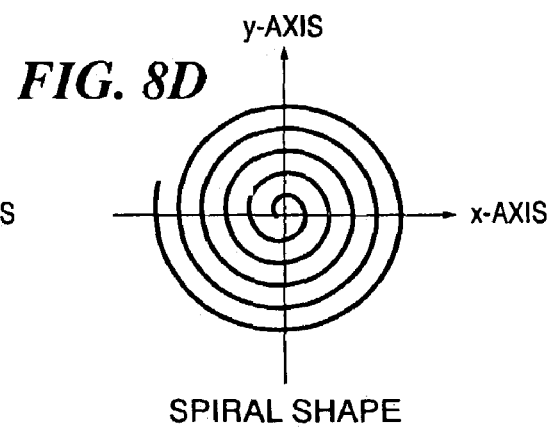
Figure 8E:
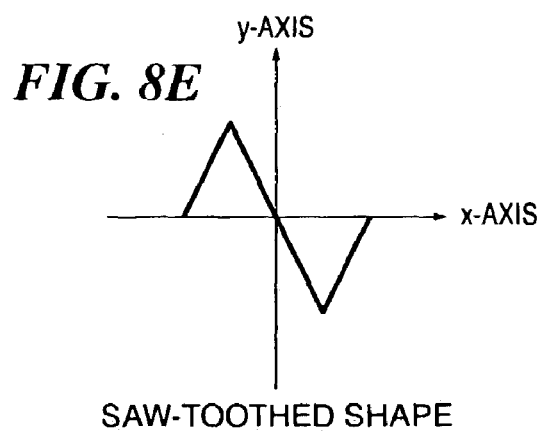
Figure 8F:
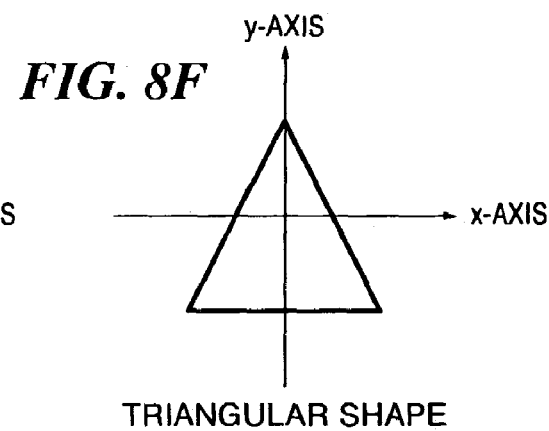

The memory M2 stores a locus shape identification table, not shown, for uniquely identifying the shape of a movement locus and a locus direction identification table, not shown, for uniquely identifying a direction in which a movement locus is drawn. More specifically, in the locus shape identification table, there are registered various shapes including shapes in FIGS. 8A to 8F, i.e. "figure-of-8" (FIG. 8A), "obliquely cut shape" (FIG. 8B), "square shape" (FIG. 8C), "spiral shape" (FIG. 8D), "saw-toothed shape" (FIG. 8E), and "triangular shape" (FIG. 8F), in addition to the above-mentioned "circular shape". The locus shape/direction detector M04 determines which one of the various shapes registered in the locus shape identification table agrees with (or most closely resembles) the shape of a movement locus determined by analyzing the acceleration data αx, αy, to thereby identify the locus shape information.

In the locus direction identification table, there are registered moving directions of the operating terminal unit OU and acceleration data displacement information indicative of displacement of acceleration data αx, αy obtained in response to the operation of the operating terminal unit OU, in association with each other. More specifically, in the locus direction identification table, various operating directions, such as "vertical direction", "horizontal direction", "counterclockwise direction" and "clockwise direction", are registered in association with respective pieces of acceleration data displacement information. Upon reception of the acceleration data αx, αy from the receiving and processing circuit M3, the locus shape/direction detector M04 refers to the locus direction identification table to identify the locus direction information.

The locus shape/direction detector M04 thus obtains locus shape information and locus direction information, and then outputs movement locus information including the locus shape information and the locus direction information to the acoustic effect application controller M03.

The acoustic effect application controller M03 determines an item of an acoustic effect to be applied, based on the movement locus information supplied from the locus shape/direction detector M04, and at the same time determines a level of the acoustic effect based on a dynamics value d supplied from the local peak/dynamics detector M01.

FIG. 9 is a diagram useful in explaining an acoustic effect item determination table TA stored in the memory M2 in FIG. 4, while FIG. 10 is a diagram useful in explaining an acoustic effect level determination table TB stored in the memory M2.

As shown in FIG. 9, in the acoustic effect item determination table TA, locus shape information, locus direction information, and acoustic effect items are registered in association with each other. The acoustic effect items include various acoustic effect items, such as "tone extension" indicative of prolonging the duration of a tone being sounded, such as fermata, slur, or tenuto, "first sound effect" indicative of adding a sound effect such as wave sound, "reverberation" indicative of applying a reverberation effect, "vibrato" indicative of vibrating the pitch of a tone, "chorus" indicative of applying a choral effect, and "second sound effect" indicative of adding a sound effect, such as clap sound.

On the other hand, as shown in FIG. 10, in the acoustic effect level determination table TB, dynamics values and acoustic effect levels are registered for each of the acoustic effect items, in such a manner that dynamics values are associated with respective acoustic effect levels. The acoustic effect level is indicative of the intensity, depth, or the like of an acoustic effect. For example, the acoustic effect levels in the acoustic effect item "first sound effect" are indicative of degrees of loudness of the first sound effect, and the acoustic effect levels in the acoustic effect item "reverberation" are indicative of degrees of depth of reverberation.

Upon reception of the movement locus information from the locus shape/direction detector M04, the acoustic effect application controller M03 searches the acoustic effect item determination table TA shown in FIG. 9 using locus shape information and locus direction information included in the movement locus information, as retrieval keys.

Now, let it be assumed that the movement locus information includes locus shape information indicative of the "circular shape" and locus direction information indicative of the "clockwise direction". In this case, the acoustic effect application controller M03 searches the acoustic effect item determination table TA using these pieces of information as retrieval keys, to thereby obtain the acoustic effect item "tone extension". Similarly, if the movement locus information includes locus shape information indicative of the "saw-toothed shape" and locus direction information indicative of the "vertical direction", the acoustic effect application controller M03 searches the acoustic effect item determination table TA using these pieces of information as retrieval keys, to thereby obtain the acoustic effect item "reverberation". Determination of the other acoustic effect terms can be carried out similarly, and therefore further description is omitted.

After determining an acoustic effect item as described above, the acoustic effect application controller M03 searches the acoustic effect level determination table TB shown in FIG. 10 using the determined acoustic effect item and a dynamics value d supplied from the local peak/dynamics detector M01 as retrieval keys.

Assuming that the determined acoustic effect item is "reverberation" and that the supplied dynamics value d is within a range of c0 to c1, the acoustic effect application controller M03 searches the acoustic effect level determination table TB using these pieces of information as retrieval keys, to thereby obtain an acoustic effect level "level 1". Determination of the other acoustic effect levels can be carried out similarly, and therefore further description is omitted. After thus determining an acoustic effect item indicative of the kind of an acoustic effect to be applied and an acoustic effect level indicative of the intensity, loudness, or the like of the acoustic effect, the acoustic effect application controller M03 outputs these pieces of information as acoustic effect control information to the music data-editing device M05 (see FIG. 5).

The music data-editing device M05 edits the existing music data stored in an existing music data storage device M06, based on the music reproduction control information indicative of a volume level and a performance tempo, which has been supplied from the music reproduction controller M02, and the acoustic effect control information indicative of an acoustic effect item and an acoustic effect level, which has been supplied from the acoustic effect application controller M03.

Figure 11:
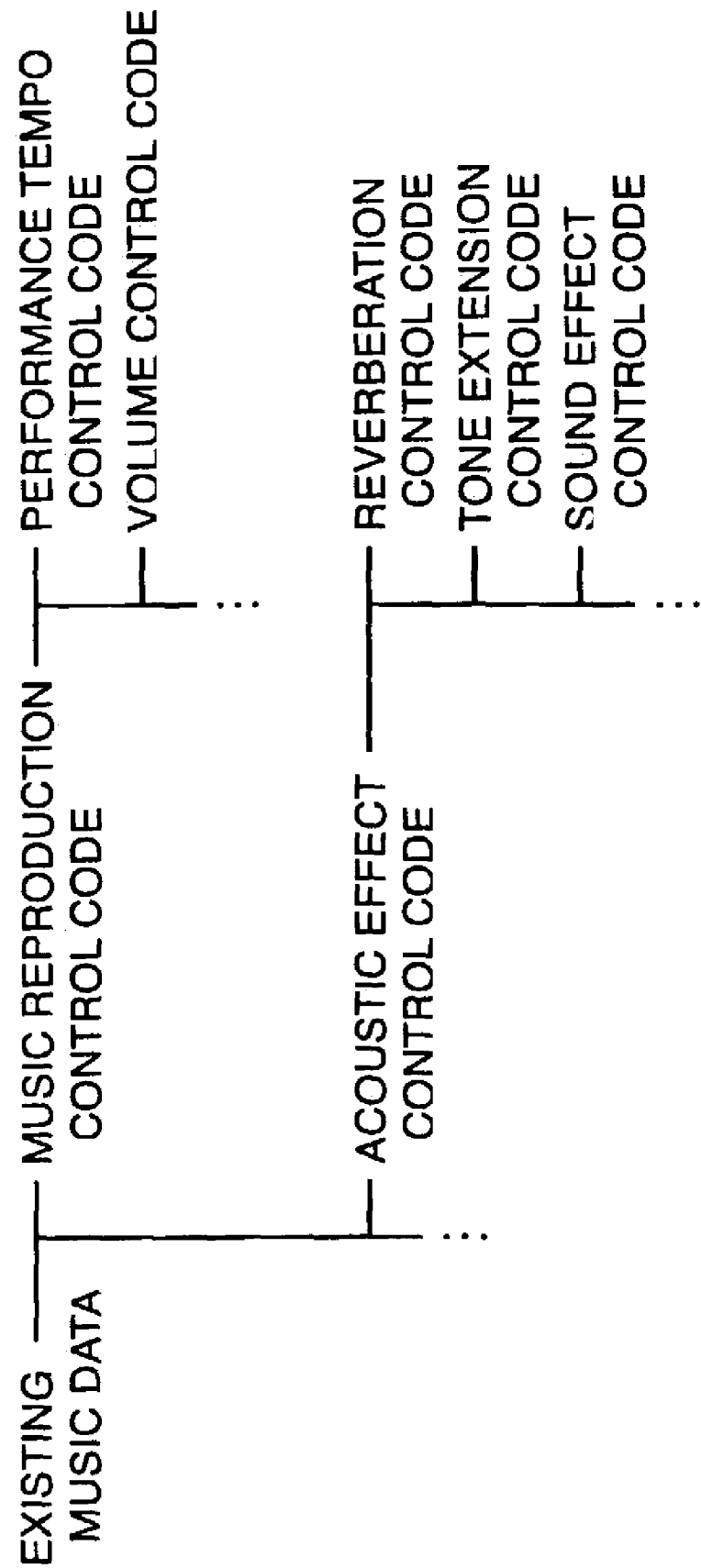
FIG. 11 is a diagram useful in explaining existing music data stored in an existing music data storage device in FIG. 5.

FIG. 11 is a diagram useful in explaining existing music data stored in the existing music data storage device M06 in FIG. 5.

As shown in FIG. 11, existing music data includes a music reproduction control code and an acoustic effect control code.

The music reproduction control code includes a performance tempo control code for controlling the performance tempo and a volume control code for controlling the volume.

The acoustic effect control code is comprised of various control codes, such as a reverberation control code for applying the reverberation effect, a tone extension control code for applying the effect of tone extension, and a sound effect control code for applying a sound effect, which correspond to the above-described acoustic effect items, respectively.

The music data-editing device M05 rewrites a volume level indicated by the volume control code and/or a performance tempo indicated by the performance tempo control code, based on the music reproduction control information supplied from the music reproduction controller M02. Further, based on the acoustic effect control information supplied from the acoustic effect application controller M03, the music data-editing device M05 rewrites an acoustic effect level (e.g. a reverberation effect level) indicated by a corresponding one of the control codes of the acoustic effect control code (e.g. the reverberation control code) corresponding to the acoustic effect control information, or adds a corresponding one of the control codes of the corresponding acoustic effect control code.

After thus editing the existing music data to generate new music data (user's original music data) reflecting a musical concept in the operator's mind, the music data-editing device M05 transfers the new music data to a user's original music data storage device M07 and outputs the same to the musical tone generator M7.

The musical tone generator M7 generates musical tone signals based on the user's original music data supplied from the music data-editing device M05, and outputs the musical tone signals as musical tones through the speaker system M7c. Thus, performance tones reflecting the musical concept in the operator's mind are sequentially sounded from the musical tone generator M7.

On the other hand, if the peak value detected this time is below the first threshold value t1 as in FIG. 6, the local peak/dynamics detector M01 judges that the operator has no intention (i.e. the local peak/dynamics detector M01 judges that noise has been generated), and does nothing. In this case, performance tones are sequentially sounded from the musical tone generator M7, based on the existing music data.

In the following, a description will be given of operations performed in editing and reproducing existing music data by using the music reproduction system 100 shown in FIG. 1.

First, the operator holding the operating terminal unit OU operates the power switch TS and the operating switch T4 thereof, as well as an operating section, not shown, of the personal computer system PS, to start the operating terminal unit OU and the personal computer system PS. Then, the operator operates the operating section to select data of a piece of music (music data) to be edited and reproduced from data of a plurality of pieces of music stored in the external storage device M6.

When the music data has been selected by the operator, the main unit CPU MO of the personal computer system PS reads out the music data from the external storage device M6, and stores the same in the existing music data storage device M06. The main unit CPU MO grasps a part composition of the music data by referring to part composition information added to a header or the like of the music data. Then, the main unit CPU M0 displays the part composition of the music data on the liquid crystal panel M5a to prompt the operator to select a part of which music data he/she desires to edit and reproduce.

The operator checks contents displayed on the liquid crystal panel M5a, and then selects one (e.g. a piano part) or more parts (e.g. all the parts) for editing and reproduction. Although in the present embodiment, a performance part or performance parts to be edited and reproduced is/are selected by the operator, the performance part or parts may be automatically selected by the personal computer system PS.

After thus selecting the part(s) to be edited and reproduced, the operator operates the operating section to enter an instruction for starting reproduction of the music data, and then starts operating the operating terminal unit OU.

Figure 12:
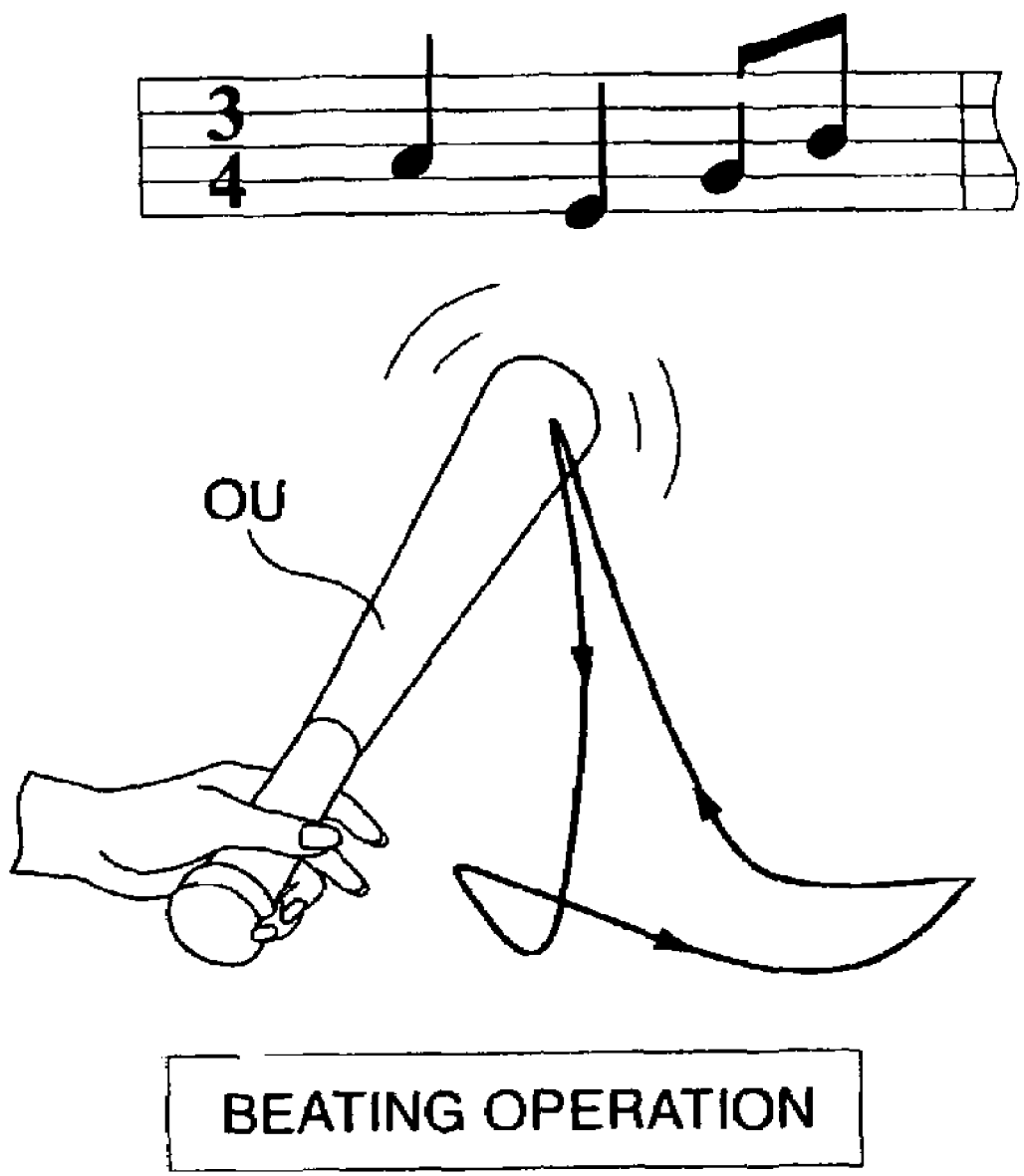
FIG. 12 is a view useful in explaining a beating operation of the operating terminal unit shown in FIG. 2.

Let it be assumed that at this time, the operator moves the operating terminal unit OU so as to draw a big triangle as in FIG. 12. In this case, motion information (more specifically, acceleration sensor signals $\alpha x$, $\alpha y$ indicative of respective accelerations in the x-axis and y-axis directions) corresponding to the operator's operation of the operating terminal unit OU is generated by the motion sensor SS, and transmitted to the personal computer system PS.

The local peak/dynamics detector M01 of the personal computer system PS sequentially receives pieces of the motion information via the antenna and distributor circuit M3a and the receiving and processing circuit M3, and determines an acceleration value $\alpha$ as described above (see FIG. 6), to thereby detect a local peak and dynamics.

If it is determined at this time that the detected peak value is larger than the first threshold value t1 and at the same time larger than the second threshold value t2, the local peak/ dynamics detector M01 judges that a beating operation is intended by the operator, and determines a dynamics value D. Then, the local peak/dynamics detector M01 sends the obtained dynamics value D and a notification that a first local peak has been detected, to the music reproduction controller M02. The music reproduction controller M02 determines volume levels based on dynamics values D sequentially supplied from the local peak/dynamics detector M01, and at the same time determines a performance tempo based on a time interval between first local peaks detected by the local peak/dynamics detector M01, followed by outputting these as the music reproduction control information to the music data-editing device M05.

The music data-editing device M05 edits existing music data of a predetermined part or predetermined parts (i.e. the part(s) selected by the operator) read out from the existing music data storage device M06, based on the music reproduction control information received from the music reproduction controller M02. Then, the music data-editing device M05 stores music data obtained by editing the existing music data of the predetermined part(s), i.e. user's original music data in the user's original music data storage device M07, and also delivers the user's original music data to the musical tone generator M7. As a result, performance tones are sounded from the musical tone generator M7 with the part volume and performance tempo being controlled based on the beating operation performed by the operator.

Figure 13:
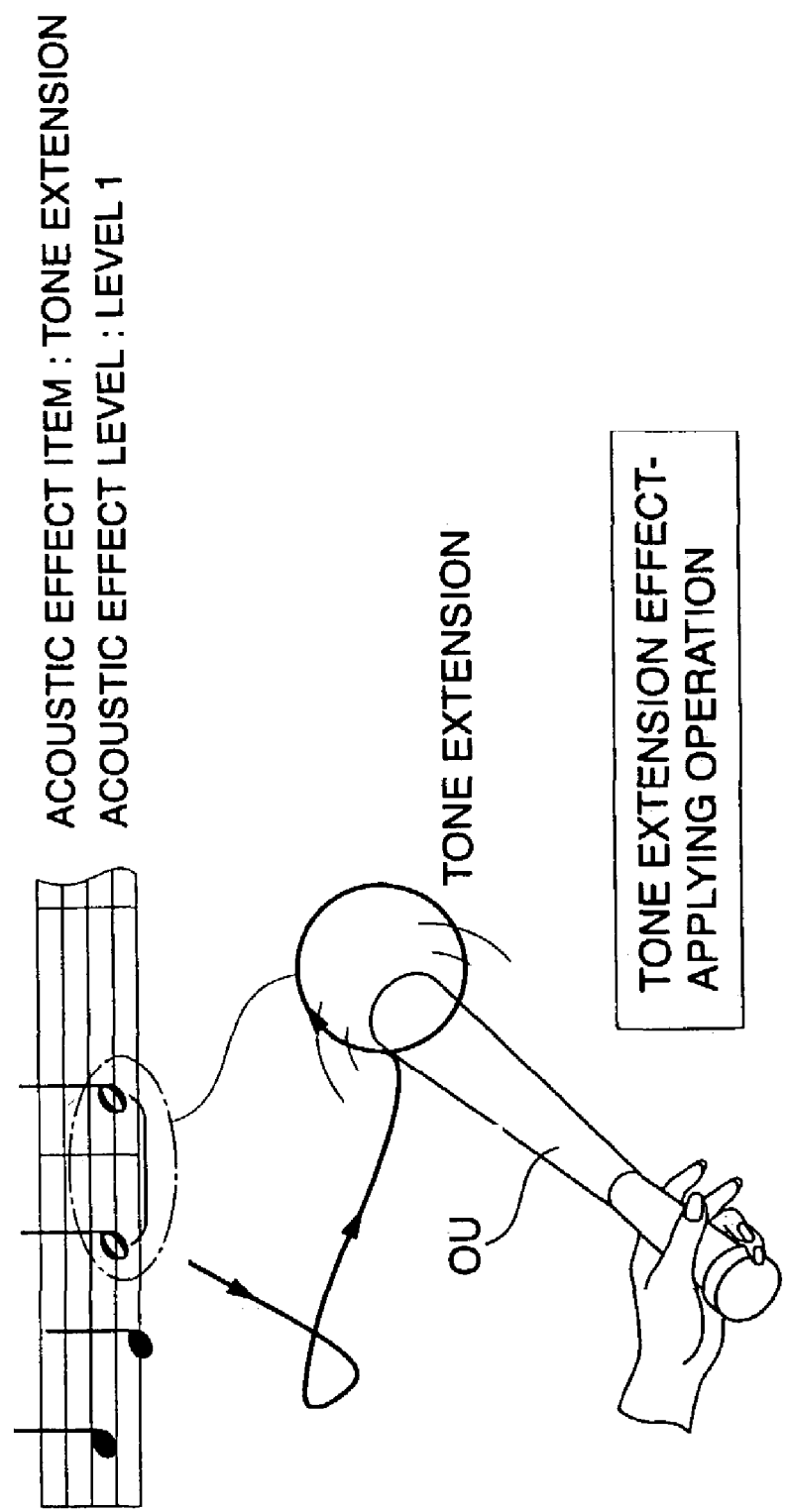
FIG. 13 is a view useful in explaining an acoustic effect-applying operation of the operating terminal unit shown in FIG. 2.

On the other hand, assuming that the operator moves the operating terminal unit OU so as to draw a small circle as in FIG. 13 during (or after) the beating operation, similarly to the above, motion information (more specifically, the acceleration sensor signals αx, αy indicative of respective accelerations in the x-axis and y-axis directions) corresponding to the operation is generated by the motion sensor SS and transmitted to the personal computer system PS.

After receiving pieces of the motion information via the antenna and distributor circuit M3a and the receiving and processing circuit M3, the local peak/dynamics detector M01 of the personal computer system PS determines an acceleration value α as described above (see FIG. 6), to thereby detect a local peak and dynamics.

If it is determined at this time that the detected peak value is larger than the first threshold value t1 and at the same time smaller than the second threshold value t2, the local peak/dynamics detector M01 judges that acoustic effect application is intended by the operator, and determines a dynamics value d. Then, the local peak/dynamics detector M01 sends the obtained dynamics value d and a notification that a second local peak has been detected to the acoustic effect application controller M03.

The locus shape/direction detector M04 determines movement locus information including locus shape information (locus shape information indicative of the "circular shape" in the illustrated example of FIG. 13) and locus direction information (locus direction information indicative of the "clockwise direction" in the illustrated example of FIG. 13) based on the motion information received via the receiving and processing circuit M3, and outputs the obtained movement locus information to the acoustic effect application controller M03.

When receiving the dynamics value d from the local peak/dynamics detector M01 and the movement locus information from the locus shape/direction detector M04, the acoustic effect application controller M03 determines an acoustic effect item to be applied and an acoustic effect level by referring to the acoustic effect item determination table TA shown in FIG. 9 and the acoustic effect level determination table TB shown in FIG. 10. Then, the acoustic effect application controller M03 outputs the thus determined acoustic effect item (tone extension in the illustrated example of FIG. 13) and acoustic effect level (level 1 in the illustrated example of FIG. 13) as acoustic effect control information to the music data-editing device M05.

The music data-editing device M05 edits the existing music data of the predetermined part(s) based on the acoustic effect control information supplied from the acoustic effect application controller M03. Then, the music data-editing device M05 stores the edited music data, i.e. the user's original music data in the user's original music data storage device M07, and delivers the data to the musical tone generator M7 at the same time. As a result, performance tones are sounded from the musical tone generator M7 with the acoustic effect applied thereto in response to the acoustic effect-applying operation (tone extension effect-applying operation in the illustrated example of FIG. 13) performed by the operator. The operation in the case where the operator performs operation for applying another acoustic effect during (or after) the beating operation (see e.g. a reverberation effect-applying operation in FIG. 14) is almost the same as the above described operation, and therefore description thereof is omitted.

As described above, the music reproduction system 100 according to the present embodiment enables an operator to control the performance tempo and whole volume of a piece of music as well as to apply desired acoustic effects to the piece of music e.g. according to the musical concept in his/her mind, merely by simple operations of the hand-held operating terminal unit OU, in real time while listening to the piece of music being reproduced by the personal computer system PS. Therefore, even a beginner having no knowledge of MIDI or the like can apply acoustic effects easily and intuitively by simple operations of the operating terminal unit OU.

In other words, the music reproduction system 100 according to the present embodiment makes it unnecessary to carry out operations which were conventionally necessary for acoustic effect application, that is, an operation of learning code names for acoustic effect application, and an operation of learning what degree of numeric value should be input to obtain what degree of an acoustic effect that is actually applied to music, for each of acoustic effects.

Further, conventionally, it was necessary to stop music reproduction temporarily to enter such a code and a numeric value. Besides, after the entry operation, it was necessary to reproduce the edited portion to confirm the result of the editing, which takes the operator a lot of time and labor for editing and reproducing a single piece of music. By contrast, with the music reproduction system 100 according to the present embodiment, an acoustic effect can be applied in real time by a simple operation of moving the operating terminal unit OU, whereby it is possible to considerably reduce time and labor required for editing and reproducing a piece of music.

The above described embodiment of the present invention is given only by way of example, and various changes and modifications may be made without departing from the spirit and scope of the present invention. The following are examples of possible variations of the above described embodiment.

Although in the above described embodiment, when the peak value is larger than the first threshold value t1 and at the same time larger than the second threshold value t2, it is judged that a beating operation is intended by the operator, and when the peak value is larger than the first threshold value t1 and at the same time smaller than the second threshold value t2, it is judged that acoustic effect application is intended by the operator, this is not limitative, but as a first variation of the present embodiment, it may be configured such that conversely to the above, when the peak value exceeds not only the first threshold value t1 but also the second threshold value t2, it is judged that acoustic effect application is intended by the operator, and when the peak value is larger than the first threshold value t1 and smaller than the second threshold value t2, it is judged that a beating operation is intended by the operator.

Further, although in the above described embodiment, whenever a second local peak is detected, a dynamics value d corresponding to the second local peak is determined and sent to the acoustic effect application controller M03, this is not limitative, but as a second variation of the present embodiment, it may be configured such that in view of variations in the dynamics value, an average value of a plurality of dynamics values d corresponding respectively to second local peaks is determined and sent to the acoustic effect application controller M03 (see FIG. 6).

Furthermore, although in the above described embodiment, a single operating terminal unit OU is used for editing and reproducing music data, this is not limitative, but a third variation of the present embodiment is possible in which a plurality of operating terminal units OU are used for editing and reproducing music data. In this case, the CPU TO of each operating terminal unit OU adds identification information (hereinafter simply referred to as a terminal ID) for identifying the operating terminal unit OU itself to motion information generated by the motion sensor SS, and then transmits the resulting motion information to the personal computer system PS.

The memory M2 of the personal computer system PS stores terminal ID's for identifying the respective operating terminal units OU under the control of the personal computer system PS. When receiving the motion information via the antenna and distributor circuit M3a and the receiving and processing circuit M3, the main unit CPU MO of the personal computer system PS compares the terminal ID added to the motion information with the terminal ID's stored in the memory M2, to identify the operating terminal unit OU that sent the motion information. Further, the main unit CPU MO selects one (e.g. a violin part) or more parts (e.g. all the parts) to be edited and reproduced by referring to a part assignment table, not shown, stored in the memory M2.

In the part assignment table, there are registered terminal ID's and parts to be edited and reproduced in association with each other. For an example, in the part assignment table, a terminal ID-1 is associated with the violin part, a terminal ID-2 with the cello part, and the piano part, ..., and a terminal ID-k with the trumpet part. When acquiring the terminal ID added to the motion information, the main unit CPU MO then searches the part assignment table using the terminal ID as a retrieval key.

After the main unit CPU MO identifies the part(s) to be edited and reproduced by searching the part assignment table, the same operations as those of the above described embodiment are carried out, and therefore description thereof is omitted.

Further, although in the above described embodiment, the acoustic effect level is determined based on the dynamics value (see the acoustic effect level determination table TB shown in FIG. 10), this is not limitative, but as a fourth variation, it may be configured such that the acoustic effect level is determined based on the time interval (second peak detection interval) T between detections of two second peaks shown in FIG. 6. For example, when the second peak detection interval is short, the acoustic effect level is set high, whereas when the second peak detection interval is long, the acoustic effect level is set low.

Moreover, although in the above described embodiment and variations, the operating terminal unit OU and the personal computer system PS are provided in separate bodies, this is not limitative, but as a fifth variation, it may be configured such that the operating terminal unit OU has incorporated therein various hardware resources forming the personal computer system PS to integrate the personal computer system PS into the operating terminal unit OU, and the editing and reproduction of music data is executed by the operating terminal unit OU.

The present invention may either be applied to a system composed of a plurality of apparatuses or to a single apparatus.

It is to be understood that the functions of the main unit CPU MO of the personal computer system PS and the CPU TO of the operating terminal unit according to the present embodiment and variations, described above, can also be realized by software. It also goes without saying that the object of the present invention may be accomplished by supplying a system or an apparatus with a storage medium in which a program code of software which realizes the functions of any of the above described embodiment and variations, and causing a computer (CPU or MPU) of the system or apparatus to read out and execute the program code stored in the storage medium.

In this case, the program code itself read from the storage medium realizes the functions of any of the above described embodiment and variations, and hence the storage medium on which the program code is stored constitutes the present invention.

Examples of the storage medium for supplying the program code include a floppy (registered trademark) disk, a hard disk, an optical disk, a magneto optical disk, a CD-ROM, a CD-R, a CD-RW, a DVD-ROM, a DVD-RAM, a DVD-RW, a DVD+RW, a magnetic tape, a nonvolatile memory card, and a ROM. Downloading via a network can also be utilized.

Further, it is to be understood that the functions of any of the above described embodiment and variations may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiment and variations may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

The entire content of Priority Document No. 2002-211322 is incorporated herein by reference.

What is claimed is:
1. A music reproduction system comprising:
an operating terminal unit that can be carried by an operator, and generates motion information in response to motion of the operator carrying said operating terminal unit;

a music editing apparatus that receives the motion information from said operating terminal unit and edits music data of a piece of music to be reproduced based on the received motion information; and a musical tone generating device that reproduces the edited music data supplied from said music editing apparatus to generate musical tones;

wherein said music editing apparatus comprises:

a detector device that detects peak information indicative of magnitude of the motion in a predetermined direction of the operator from the received motion information;

a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value;

a music data editing device that edits the music data based on the music reproduction control information and the acoustic effect control information generated by said control information generating device; and an output device that outputs the music data edited by said music data editing device to said musical tone-generating device.

2. A music editing system comprising:

an operating terminal unit that can be carried by an operator, and generates motion information in response to motion of the operator carrying said operating terminal unit; and a music editing apparatus that receives the motion information from said operating terminal unit and edits music data of a piece of music to be reproduced based on the received motion information;

wherein said music editing apparatus comprises:

a detector device that detects peak information indicative of magnitude of the motion in a predetermined direction of the operator from the received motion information;

a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value; and a music data editing device that edits the music data based on the music reproduction control information and the acoustic effect control information generated by said control information generating device.

3. A music editing apparatus comprising:

a receiver device that receives, from an operating terminal unit that can be carried by an operator, motion information generated in response to motion of the operator carrying the operating terminal unit;

a detector device that detects peak information indicative of magnitude of the motion in a predetermined direction of the operator from the motion information received by said receiver device;

a music reproduction control information generating device that generates music reproduction control information for controlling music reproduction of a piece of music, based on the peak information, when a peak value indicated by the peak information is larger than a first predetermined threshold value and a second predetermined threshold value;

an acoustic effect control information generating device that generates acoustic effect control information for controlling at least one acoustic effect to be applied to the piece of music, based on the peak information, when the peak value indicated by the peak information is larger than the first predetermined threshold value and smaller than the second predetermined threshold value; and a music data editing device that edits music data of the piece of music based on the music reproduction control information and the acoustic effect control information generated by said music reproduction control information generating device and said acoustic effect control information generating device, respectively.

4. A music editing apparatus as claimed in claim 3, further comprising:

a locus shape identifying device that identifies a shape of a locus drawn by the operating terminal unit in accordance with the motion of the operator, based on the motion information, when the peak value indicated by the peak information is larger than the first predetermined threshold value and smaller than the second predetermined threshold value; and a first storage device that stores locus shape information indicative of shapes of loci to be drawn by the operating terminal unit and acoustic effect item information indicative of acoustic effects to be applied to the piece of music, in association with each other; and wherein said acoustic effect control information generating device searches said first storage device using the shape of the locus identified by said locus shape identifying device, as a retrieval key, to obtain corresponding acoustic effect item information, and then generates the acoustic effect control information for controlling the acoustic effect indicated by the obtained acoustic effect item information, based on the peak information.

5. A music editing apparatus as claimed in claim 4, wherein said locus shape identifying device identifies not only the shape of the locus drawn by the operating terminal unit in accordance with the motion of the operator, but also a direction of the locus, based on the motion information, wherein said first storage device stores the locus shape information, locus direction information indicative of directions of the loci, and the acoustic effect item information, in association with each other, and wherein said acoustic effect control information generating device searches said first storage device using the shape of the locus and the direction of the locus identified by said locus shape identifying device, as retrieval keys, to obtain the corresponding acoustic effect item information from the stored acoustic effect item information, and then generates the acoustic effect control information for controlling the acoustic effect indicated by the obtained acoustic effect item information, based on the peak information.

6. A music editing apparatus as claimed in claim 4, further comprising a second storage device that stores peaks values of the peak information and acoustic effect level values indicative of magnitude of each of acoustic effects to be applied to the piece of music, in association with each other, and wherein said acoustic effect control information generating device searches said second storage device using the peak information detected by said detector device, as a retrieval key, to obtain a corresponding acoustic effect level value from the stored acoustic effect level values, and searches said first storage device using the shape of the locus and the direction of the locus identified by said locus shape identifying device, as retrieval keys, to obtain the corresponding acoustic effect item information from the stored acoustic effect item information, and then generates the acoustic effect control information based on the obtained acoustic effect level value and the obtained acoustic effect item information.

7. A music editing terminal unit comprising:
a motion information generating device that can be carried by an operator, and generates motion information in response to motion of the operator;
a music editing device that edits music data of a piece of music to be reproduced based on the motion information generated by said motion information generating device;
a detector device that detects peak information indicative of magnitude of the motion in a predetermined direction of the operator from the motion information; and
a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value,
wherein said music editing device edits the music data based on the music reproduction control information and the acoustic effect control information generated by said control information generating device.

8. A music reproduction terminal unit comprising:
a motion information generating device that can be carried by an operator, and generates motion information in response to motion of the operator;
a music editing device that edits music data of a piece of music to be reproduced based on the motion information generated by said motion information generating device;
a detector device that detects peak information indicative of magnitude of the motion in a predetermined direction of the operator from the motion information; and
a control information generating device that generates music reproduction control information for controlling music reproduction of the piece of music, based on the peak information, when a peak value indicated by the peak information is larger than a first predetermined threshold value and a second predetermined threshold value, and generates acoustic effect control information for controlling at least one acoustic effect to be applied to the piece of music, based on the peak information, when the peak value indicated by the peak information is larger than the first predetermined threshold value and smaller than the second predetermined threshold value,
wherein said music data editing device edits the music data based on the music reproduction control information and the acoustic effect control information generated by said control information generating device, and outputs the edited music data to said musical tone generating device.

9. A method of controlling a music editing apparatus that edits music data of a piece of music to be reproduced, comprising the steps of:
receiving, from an operating terminal unit that can be carried by an operator, motion information generated in response to motion of the operator carrying the operating terminal unit;
detecting peak information indicative of magnitude of the motion in a predetermined direction of the operator from the received motion information;
generating music reproduction control information for controlling music reproduction of the piece of music, based on the peak information, when a peak value indicated by the peak information is larger than a first predetermined threshold value and a second predetermined threshold value;
generating acoustic effect control information for controlling at least one acoustic effect to be applied to the piece of music, based on the peak information, when the peak value indicated by the peak information is larger than the first predetermined threshold value and smaller than the second predetermined threshold value; and
editing the music data based on the generated music reproduction control information and the generated acoustic effect control information.

10. A program for causing a computer to execute a method of controlling a music editing apparatus that edits music data of a piece of music to be reproduced,
the program comprising:
a module for receiving, from an operating terminal unit that can be carried by an operator, motion information generated in response to motion of the operator carrying the operating terminal unit;
a module for detecting peak information indicative of magnitude of the motion in a predetermined direction of the operator from the received motion information;
a module for generating music reproduction control information for controlling music reproduction of the piece of music, based on the peak information, when a peak value indicated by the peak information is larger than a first predetermined threshold value and a second predetermined threshold value;
a module for generating acoustic effect control information for controlling at least one acoustic effect to be applied to the piece of music, based on the peak information, when the peak value indicated by the peak information is larger than the first predetermined threshold value and smaller than the second predetermined threshold value; and a module for editing the music data based on the generated music reproduction control information and the generated acoustic effect control information.

11. A music editing apparatus comprising:

a receiver device that receives, from an operating terminal unit that can be carried by an operator, motion information generated in response to motion of the operator carrying the operating terminal unit;

a detector device that detects peak information indicative of magnitude of the motion of the operator from the motion information received by said receiver device;

a music reproduction control information generating device that generates music reproduction control information for controlling music reproduction of a piece of music, based on the peak information, when a peak value indicated by the peak information is larger than a first predetermined threshold value and a second predetermined threshold value;

an acoustic effect control information generating device that generates acoustic effect control information for controlling at least one acoustic effect to be applied to the piece of music, based on the peak information, when the peak value indicated by the peak information is larger than the first predetermined threshold value and smaller than the second predetermined threshold value;

a music data editing device that edits music data of the piece of music based on the music reproduction control information and the acoustic effect control information generated by said music reproduction control information generating device and said acoustic effect control information generating device, respectively; and a locus shape identifying device that identifies a shape of a locus drawn by the operating terminal unit in accordance with the motion of the operator, based on the motion information, when the peak value indicated by the peak information is larger than the first predetermined threshold value and smaller than the second predetermined threshold value; and a first storage device that stores locus shape information indicative of shapes of loci to be drawn by the operating terminal unit and acoustic effect item information indicative of acoustic effects to be applied to the piece of music, in association with each other; and wherein said acoustic effect control information generating device searches said first storage device using the shape of the locus identified by said locus shape identifying device, as a retrieval key, to obtain corresponding acoustic effect item information, and then generates the acoustic effect control information for controlling the acoustic effect indicated by the obtained acoustic effect item information, based on the peak information.

12. A music editing apparatus as claimed in claim 11, wherein said locus shape identifying device identifies not only the shape of the locus drawn by the operating terminal unit in accordance with the motion of the operator, but also a direction of the locus, based on the motion information, wherein said first storage device stores the locus shape information, locus direction information indicative of directions of the loci, and the acoustic effect item information, in association with each other, and wherein said acoustic effect control information generating device searches said first storage device using the shape of the locus and the direction of the locus identified by said locus shape identifying device, as retrieval keys, to obtain the corresponding acoustic effect item information from the stored acoustic effect item information, and then generates the acoustic effect control information for controlling the acoustic effect indicated by the obtained acoustic effect item information, based on the peak information.

13. A music editing apparatus as claimed in claim 11, further comprising a second storage device that stores peaks values of the peak information and acoustic effect level values indicative of magnitude of each of acoustic effects to be applied to the piece of music, in association with each other, and wherein said acoustic effect control information generating device searches said second storage device using the peak information detected by said detector device, as a retrieval key, to obtain a corresponding acoustic effect level value from the stored acoustic effect level values, and searches said first storage device using the shape of the locus and the direction of the locus identified by said locus shape identifying device, as retrieval keys, to obtain the corresponding acoustic effect item information from the stored acoustic effect item information, and then generates the acoustic effect control information based on the obtained acoustic effect level value and the obtained acoustic effect item information.

* * * * *